May 6, 1952 T. A. HANSEN 2,595,656
ELECTRONIC SYNCHRONIZATION SYSTEM
Filed Oct. 15, 1948 4 Sheets-Sheet 1

INVENTOR
THEODORE A. HANSEN
BY Emery Robinson
ATTORNEY

May 6, 1952

T. A. HANSEN 2,595,656

ELECTRONIC SYNCHRONIZATION SYSTEM

Filed Oct. 15, 1948

4 Sheets-Sheet 2

INVENTOR
THEODORE A. HANSEN
BY Emery Robinson
ATTORNEY

ELECTRONIC SYNCHRONIZATION SYSTEM

Filed Oct. 15, 1948 4 Sheets-Sheet 3

INVENTOR
THEODORE A. HANSEN
BY Emery Robinson
ATTORNEY

May 6, 1952 T. A. HANSEN 2,595,656

ELECTRONIC SYNCHRONIZATION SYSTEM

Filed Oct. 15, 1948 4 Sheets-Sheet 4

INVENTOR
THEODORE A. HANSEN
BY Emery Robinson
ATTORNEY

Patented May 6, 1952

2,595,656

UNITED STATES PATENT OFFICE 2,595,656

ELECTRONIC SYNCHRONIZATION SYSTEM

Theodore Alan Hansen, Park Ridge, Ill., assignor to Teletype Corporation, Chicago, Ill., a corporation of Delaware Application October 15, 1948, Serial No. 54,773

10 Claims. (Cl. 178—53)

Figures 1, 4:
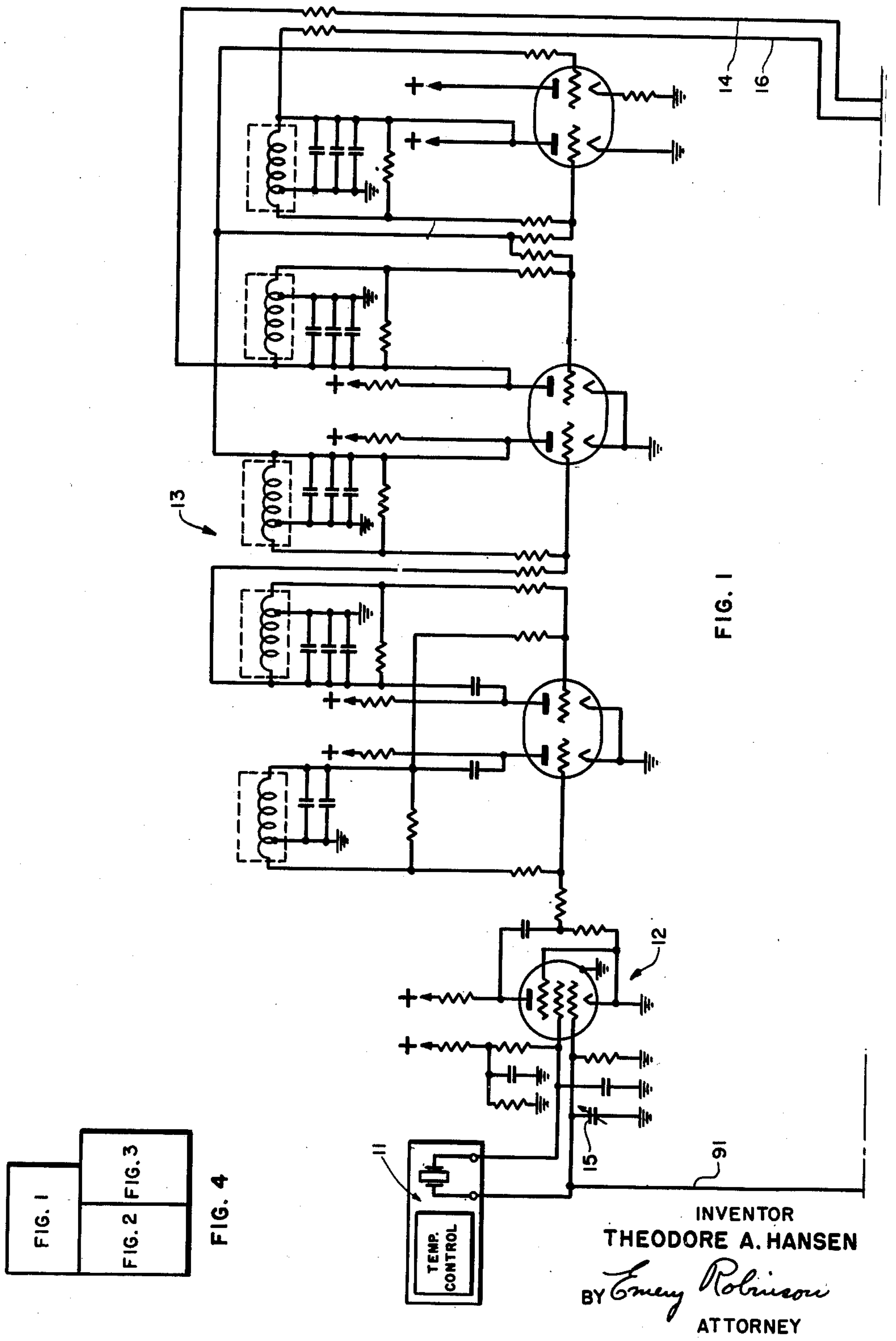

The present invention relates to synchronization circuits and more particularly to a synchronization circuit for use in multiplex telegraph transmission systems.

It is well known that in the operation of multiplex telegraph systems it is necessary that close synchronization be maintained between transmitting and receiving stations. In prior systems this has been done with elaborate fork-controlled rotary converters and with fork-controlled thyratron inverters supplying power to synchronous motors driving brush or cam type multiplex distributors. In some previous multiplex systems the receiving distributor was operated slightly faster than the transmitting distributor, with phase correction applied as a brake to the distributor, slowing it down, so that if the signal was dropped for a period of a few seconds synchronism was lost, and it was a laborious process to restore synchronism.

In the present invention the sending and receiving distributors are operated at identical speeds, driven by quartz-crystal controlled drive units, so that even if the communication channel is broken synchronism will be maintained for relatively long periods of time. However, with the most precise quartz-crystals obtainable there will be some drift of frequency of the transmitting drive oscillator with respect to the receiver, and it is necessary to have some means for correcting for the slight drift in frequency, which appears as a shift in phase of the signal impulse with respect to the receiving distributor and driving oscillator.

Accordingly, an object of the present invention is to provide a new and discrete arrangement for recognizing and correcting for slow-rate phase displacement of the received multiplex signals, and thus to maintain a condition of system synchronization.

A further object of the present invention is to provide a system of phase correction in which phase displacement between received signals and the local distributor is translated into frequency change of the receiving crystal oscillator, through the medium of a reactance tube.

A still further object of the invention is to provide a synchronization system in which differences in frequency between transmitting and receiving crystal oscillators are measured and visually indicated, both in amount and in relative direction fast or slow.

Yet another object of the invention is to provide a synchronization system which is operable over radio circuits in which signal phase shifts due to multipath transmission effects and atmospherics are present.

A further object of the present invention is to include a simple adjustable means for varying manually the frequency of a crystal controlled oscillator driving a multiplex receiving distributor for establishing synchronous operation with a similar crystal driven transmitting distributor, and when once established to maintain automatically a condition of synchronism.

A still further object of the present invention is to provide a synchronization system which utilizes electronic means in its entirety.

Another object of the present invention is to provide an electronic synchronization system for use in a multiplex system controlled by crystal oscillators.

Other features and objects of the invention will become apparent from the following detailed description of the synchronization circuit.

The synchronization circuit comprises generally a comparison circuit comprised of a pair of corrector gate tubes which are under the joint control of pulses resulting at the transition points of received line signals and the distributor drive pulses initiated through the operation of a crystal-controlled oscillator and frequency divider. The corrector gate tubes in turn control a detector and filter circuit which indicates whether the receiving apparatus is operating too slow or too fast with respect to the received line signals. These latter circuits control a reactance tube which is connected in the crystal oscillator grid circuit for altering the input reactance of such circuit and thereby altering the output frequency of the crystal controlled oscillator and frequency divider.

Figure 2:
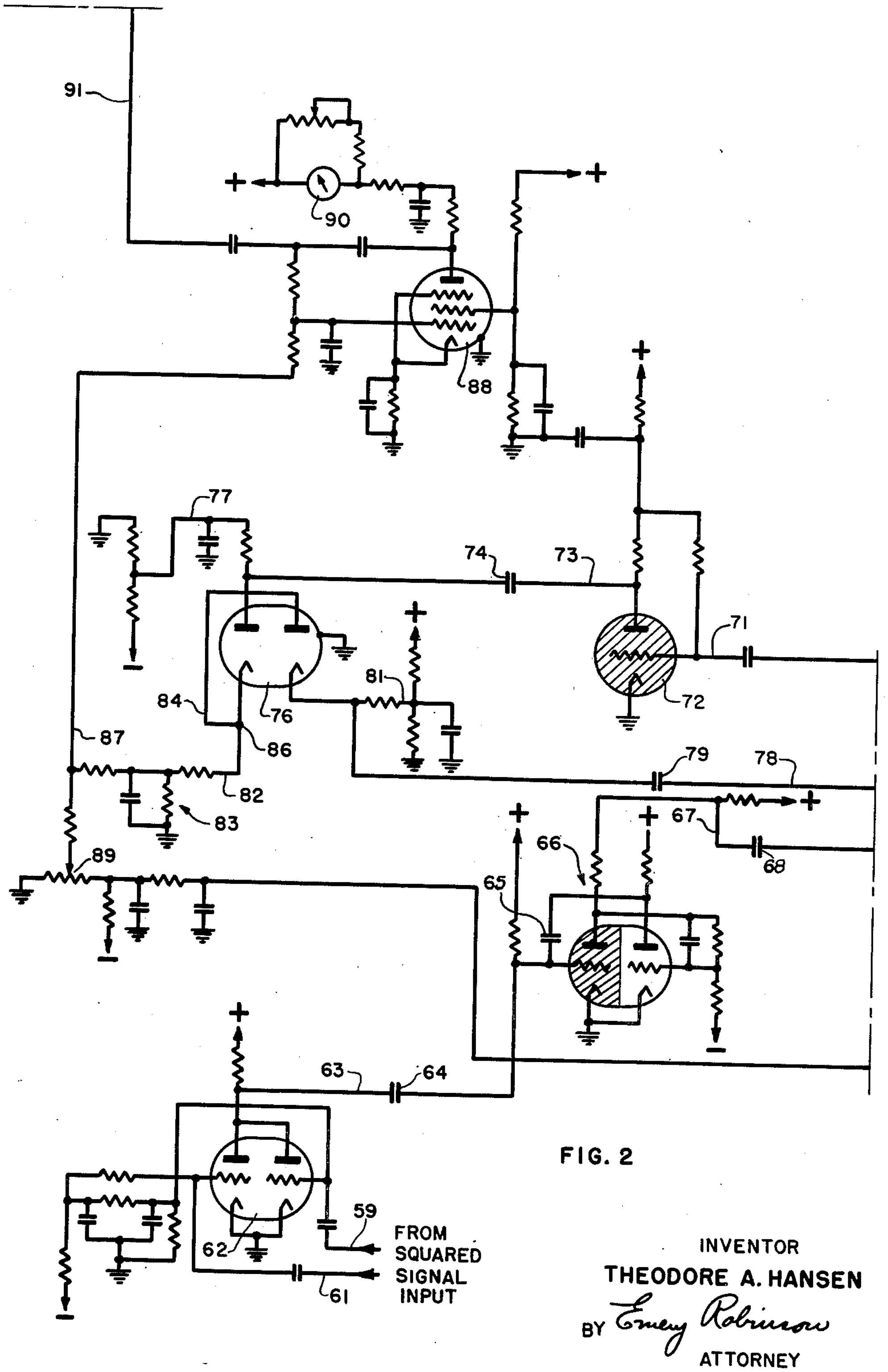
Figure 3:
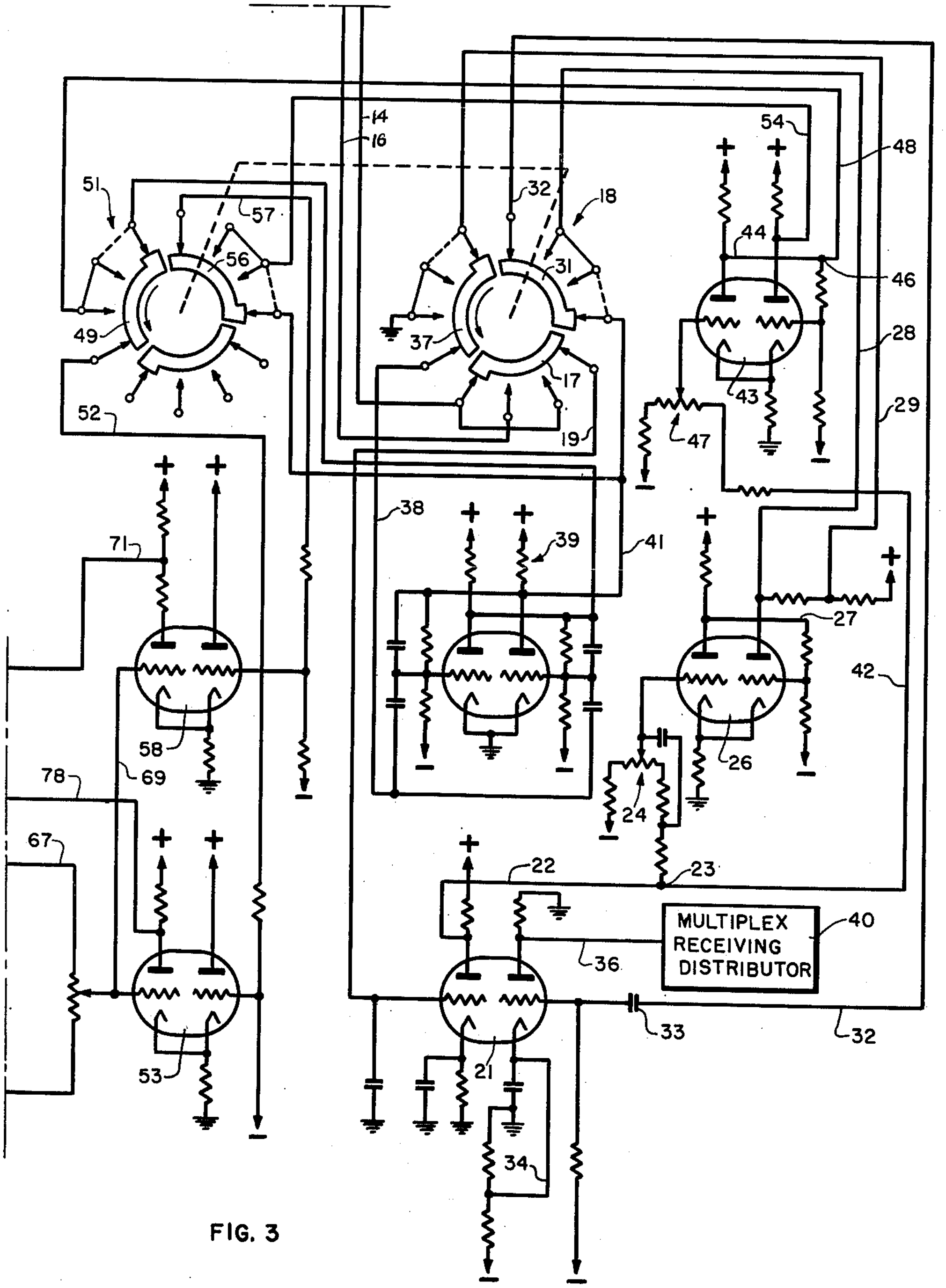
Figure 5:
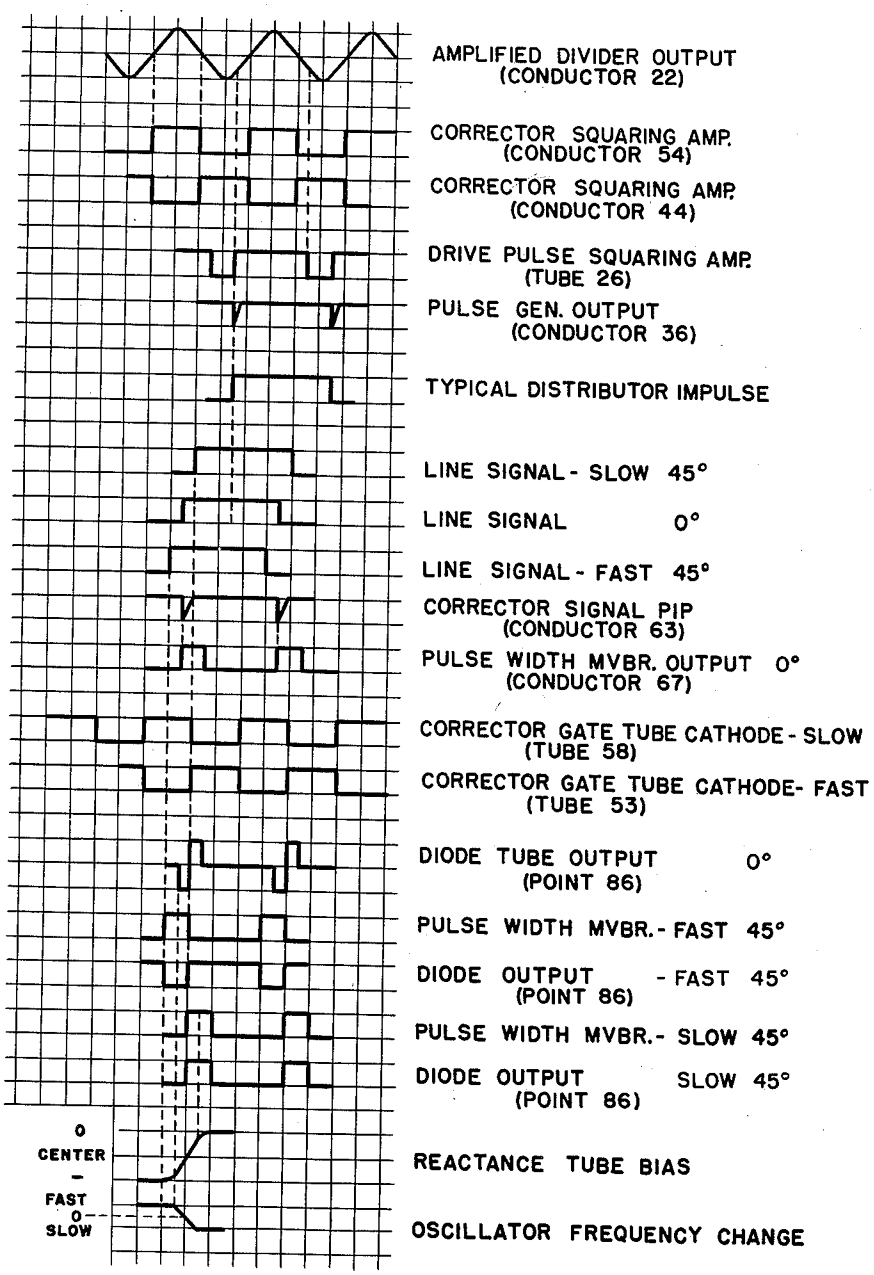

A more complete understanding of the invention may be had by reference to the following detailed description thereof when read in conjunction with the accompanying drawings, in which:

Figs. 1 to 3, inclusive, illustrate diagrammatically the circuits and components forming the synchronization means;

Fig. 4 illustrates in block diagram the correct arrangement of Figs. 1 to 3 to form an operative circuit, and Fig. 5 illustrates various wave characteristics and the relative timing of operational sequences of the synchronization apparatus.

In the following description it first will be described how the driving means for the receiving multiplex distributor are operated and thereafter how the same cooperates with the synchronization circuits to assure that the driving means are operating at the correct speed with respect to the received line signals.

It may also be mentioned at this time that the apparatus or circuit is designed primarily for association with a multiplex telegraph system disclosed and described in copending application Serial No. 54,772 filed on October 15, 1948 in the name of T. A. Hansen. This system is so designed as to operate over either two, three, or four channels and therefore the description of the drive means will include the derivation of driving control for all three channels.

The drive means for the receiving distributor is provided with a temperature controlled crystal unit indicated generally by the numeral 11 which is connected to an electron coupled oscillator indicated generally by the numeral 12. It is not deemed necessary to describe in detail the function or operation of the crystal unit 11 and the electron coupled oscillator 12 as they are both well known in the art either individually or in operative conjunction with each other.

The output of the electron coupled oscillator 12 is impressed on the first stage of a plural stage frequency divider indicated generally by the numeral 13. No description of the frequency divider will be given inasmuch as the same is illustrated and described in U. S. Patent No. 2,410,389 issued to E. Norrman on October 29, 1946, in detail. The output of the frequency divider in the form of a distorted wave is impressed on a conductor 14 from one stage of the frequency divider and upon a conductor 16 from a second stage of the frequency divider. The purpose of tapping the frequency divider at two points to derive two different output frequencies is to allow the receiving distributor apparatus to be operated for transmission of either two, three or four channels of intelligence.

The conductor 14 is connected to one spring clip of a contact rotor 17 forming a portion of a manually operable selector switch indicated generally by the numeral 18. The switch 18 is provided to allow operation of the apparatus on two, three, or four channels of transmission. The circuit may be further traced from the rotor 17 over a conductor 19 to the grid of the left-hand portion of an amplifier tube 21. The left portion of the tube 21 will conduct in accordance with the input, alternately being conducting and nonconducting. During the periods that the left-hand portion of the tube 21 is nonconducting its anode potential will rise due to the connection to a source of positive battery with a corresponding rise in potential to a conductor 22 connected in the anode circuit. A circuit may be further traced on the conductor 22 to a junction point 23 and thence through a selection network indicated generally by the numeral 24 to the normally negatively biased grid of the left portion of a squaring amplifier twin vacuum tube 26. The selection network 24 is adjustable in order to provide a desired bias input to the grid of the left portion of the squaring amplifier 26.

During the intervals that the left portion of the tube 26 is conducting a potential drop will occur in its anode circuit and correspondingly on a conductor 27 connected in its anode circuit. The conductor 27 is connected to the normally negatively biased grid of the right-hand portion of the squaring amplifier tube 26 and thus during the interval that the left-hand portion of the tube 26 is conducting the negative bias will prevail on the grid of the right-hand portion of the tube thereby rendering that portion nonconducting. During the alternate intervals, that is, when the left-hand portion of the tube 26 is nonconducting, the potential in the anode circuit and on the conductor 27 will rise thereby allowing the right right-hand portion of the tube 26 to become conducting. The two conditions described above will occur alternately thereby allowing a square wave output to be derived in the anode circuit of the right-hand portion of the tube, which is positively biased, over conductors 28 and 29.

The conductor 28 forms a portion of a circuit which may be traced to a spring clip associated with a contact rotor 31 of the selector switch 18. The selector switch 18 is illustrated in a position for two channel operation but assuming that four channel operation is desired the spring clip associated with the conductor 28 will be in engagement with the rotor 31 thereby completing a circuit through the rotor and over a conductor 32 and through a condenser 33 to the normally negatively biased grid of the right-hand portion of the tube 21. Thus, during the intervals that the right-hand portion of the tube 26 is not conducting with the subsequent rise in potential on the conductor 28, such positive potential will be impressed on the conductor 32 to the grid of the right-hand portion of the tube 21 thereby causing that portion of the tube to conduct. As the anode of the right-hand portion of the tube 21 is at ground potential at such time as that portion of the tube conducts, negative potential will be impressed over a conductor 34 from the negative battery source to which it is connected to the cathode of the right-hand portion of the tube 21. Because the grid is positive at this time the tube will conduct, negative potential appearing on the anode circuit and also to a conductor 36 connected therewith. Because of the condenser 33 the right-hand portion of the tube 21 will be conducting momentarily for each time that the right-hand portion of the tube 26 is rendered nonconducting and therefore a succession of negative pulses will be impressed on the conductor 36. The conductor 36 is connected to and impresses the negative pulses to a receiving distributor 40 as drive pulses to cause that distributor to operate to receive transmitted signals. The use of the negative drive pulses on the receiving distributor to cause its operation may be had by reference to the copending T. A. Hansen application mentioned previously.

If three channel operation of the receiving multiplex distributor is desired the selector switch 18 will be so positioned that the spring clip associated with the conductor 16 will be in engagement with the rotor 17. Under this condition the conductor 14 will be disengaged from the rotor 17 and the new frequency will be applied over the conductor 19 and through the various previously described circuits to obtain negative pulses of a different frequency from the right-hand portion of the tube 21 to the conductor 36.

If two channel operation is desired the selector switch 18 will be positioned as is illustrated in the drawings. Under this condition the output from the frequency divider 13 will be impressed over the conductor 14 to the rotor 17 and thence over the conductor 19 to operate the left-hand portion of the tube 21. This portion of the tube will operate as described previously to control the left-hand portion of the tube 26. This in turn will control the right-hand portion of the tube 26 which will operate as described previously to impress square waves on the conductors 28 and 29. However, at this time the conductor 28 will no longer be in engagement with the rotor 31 and therefore will not connect electrically with the conductor 32 for controlling the right-hand portion of the tube 21. Instead, the square waves will be impressed over the conductor 29 to a contact rotor 37 and thence over a conductor 38 to supply operating potential to an Eccles-Jordan flip-flop circuit indicated generally by the numeral 39. It is not deemed necessary to describe in detail the interconnecting circuits for operation of the Eccles-Jordan circuit as the same is well known in the art. The output of the Eccles-Jordan circuit is impressed on a conductor 41 to the rotor 31 and thence over the conductor 32 to operate the right-hand portion of the tube 21. In this manner negative polarity pulses will be impressed on the conductor 36 at the correct frequency for operation of the system with two channels of transmission only.

From the above description it has been seen how the distributor drive means are operated for initiating negative pulses which will operate the receiving distributor 40 for transmission on two, three, or four channels.

In order that the receiving distributor may operate in complete synchronism with the transmitting distributor for a proper reception of signal impulses it is necessary that a synchronization or corrector circuit of some type be utilized with the apparatus. It is true that by utilizing frequency dividers at both stations having similar control crystals it is possible to remain very close to synchronism. However, as pointed out previously even with precise crystals there will be a slight relative drift in frequency and synchronism will eventually be lost, and therefore it is necessary to introduce some means for maintaining synchronism, which in this instance is accomplished by comparing the position of transition points in the received signals with the output of the distributor driving unit, so that any phase displacement is readily recognized and proper correction established.

It is to be remembered that during the prior description it was mentioned that the output of the frequency divider 13 was amplified by means of the left-hand portion of the tube 21, the output signal being impressed on a conductor 22 in the anode circuit and to a junction point 23. The amplified wave will be further impressed from the junction point 23 over a conductor 42 to the normally negatively biased grid of the left-hand portion of a squaring vacuum tube 43. The anode circuit of the left-hand portion of the squaring tube 43 is connected over a conductor 44 to a junction point 46 and thence to the normally negatively biased grid of the right-hand portion of the tube 43. The two portions of the tube 43 will thus operate in opposite relationship to each other under the control of the wave introduced from the left-hand portion of the amplifier 21, one side conducting while the opposite side is not conducting and vice versa. The tube 43 is provided with a variable coupling network 47, similar to the selection network 24.

The anode circuit of the left-hand portion of the tube 43 is also connected from the conductor 44 and the junction point 46 by means of a conductor 48 to a contact rotor 49 of a manually operable selector switch indicated generally by the numeral 51. If it is assumed that the switch 51 is in position for four channel reception the circuit may be further traced from the rotor 49, over a conductor 52, to the normally negatively biased grid of the right-hand portion of a twin triode corrector gate vacuum tube 53. The switches 18 and 51 may both be portions of a gang switch, and so will be operated together.

The anode circuit of the right-hand portion of the squaring amplifier 43 is connected by means of a conductor 54 to a spring clip associated with a contact rotor 56 of the selector switch 51. Assuming the switch 51 to be in four channel position the circuit will be completed from the rotor 51 over a conductor 57, to the normally negatively biased grid of the right-hand portion of a twin triode corrector gate vacuum tube 58.

The potential which will result in the anode circuits of the two portions of the squaring amplifier 43 and which is impressed on the conductors 48 and 54 to the grids of the right-hand portions of the corrector gate tubes 53 and 58 will be square wave in form and will be 180° out of phase with respect to each other. Balanced output is obtained by adjustment of potentiometer 47. Corrector gate tubes 53 and 58 operate so that the right-hand sections provide blocking potentials when conducting, to the respective left-hand portions of the gate tubes. When the right-hand sections are not conducting the left-hand sections operate as a normal self-biased amplifier.

It might be noted with respect to the two portions of the tube 43 that their cathodes are connected together and through a resistor to ground, and that therefore when one portion of the tube is conducting blocking potential will be applied to the opposite portion thereof tending to retain that portion in nonconducting condition.

The line signals which are received on the signaling channel are received by a line relay, not shown, and preferably passed through a conventional squaring amplifier, not shown, from which they are passed over conductors 59 and 61 and through condensers to the normally negatively biased grids of both portions of a twin triode pulse generator tube 62. The conductors are connected to opposite anodes of the squaring amplifier, so that every time a signal transition occurs potential will be impressed on the conductors 59 and 61.

If the present corrector circuit is utilized with the receiving multiplex apparatus disclosed in the above-mentioned T. A. Hansen application the conductors 59 and 61 will correspond to the conductors 1517 and 1514, respectively.

Because of the above-mentioned connections each time that a signal transition from mark to space or space to mark occurs a positive pulse will be delivered to one grid at the instant a negative pulse is delivered to the opposite grid of the tube 62. On the next reversal the grid excitation polarity will be reversed. Since both grids of the tube 62 are biased negatively beyond the cut-off condition, only positive pulses are effective. Therefore, at the time of a space to mark reversal, the right-hand portion of the tube 62 will conduct, and during a mark to space reversal of the line signal the left-hand portion of the tube will conduct, the effect of which will be to rapidly discharge the condenser 64, and sharp negative pulses will appear on the conductor 63. The conductor 63 is connected to the normally positively biased grid of the left-hand portion of a single operation or one-shot multivibrator indicated generally by the numeral 66. As is well known with respect to single operation multivibrators, upon a negative impulse being impressed on the grid of the normally conducting portion thereof, that portion will be rendered nonconducting and its opposing portion will be rendered conducting for a period necessary for the negative charge to be dissipated from a coupling condenser 65. Thereafter, the multivibrator will return to its normal condition with the normally conducting portion once again conducting and the opposed portion nonconducting. As the impulses impressed on the conductor 63 will occur for every signal transition the multivibrator 66 will be producing a plurality of positive square-topped impulses in its output circuit which is indicated as the conductor 67. The positive impulses on the conductor 67 will be coupled through a condenser 68 to a potentiometer to the normally negatively biased grid of the left-hand portion of the corrector "fast" gate tube 53 and also over a branching conductor 69 to the normally negatively biased grid of the left-hand portion of the "slow" corrector gate tube 58.

As was mentioned above the cathodes of the right and left-hand portions of the tubes 58 and 53 are connected together so that if positive potential is applied to the grid of either of the right-hand portions of the two tubes that portion of the tube will be rendered conducting and the opposing portion thereof will be blocked due to positive potential on its cathode. As the signals impressed on the grids of the right-hand portions of the two tubes 58 and 53 are 180° out of phase with respect to each other, the two portions will be conducting alternately, one portion being rendered nonconducting while the other portion is conducting. If positive potential is applied to the grids of the left-hand portion of the tubes 58 and 53 indicating a signal transition during the interval that the right-hand portion is conducting, the left-hand portion will not be rendered conducting. However, if such potential is applied at a time when the right-hand portion is not conducting, the left-hand portion will be rendered conducting.

It it be assumed that the left-hand portion of the tube 58 has been rendered conducting, its anode potential will decrease with a similar decrease on the conductor 71 connected in the anode circuit. The conductor 71 is connected through a condenser to the normally positively biased grid of a normally conducting vacuum triode 72. The negative pulse on the grid of the tube 72 will cause the tube to be rendered nonconducting resulting in an increase in its anode circuit potential. A corresponding increase in potential will be applied to the conductor 73 which is connected in the anode circuit and also through a condenser 74 to the anode of the left-hand portion of a twin diode 76. As the anode of the left-hand portion of the diode 76 is connected to a source of negative battery over a conductor 77, the positive potential from the conductor 73 to the anode must be higher in value than the negative potential supplied over the conductor 77 before the left-hand portion of the diode 76 will conduct. The tube 72 is simply a phase inverter.

If instead it be assumed that the left-hand portion of the tube 53 has been rendered conducting, such will result in a drop in anode potential. A similar potential drop will exist on a conductor 78 connected in the anode circuit and also connected through a condenser 79 to the cathode of the right-hand portion of the twin diode 76. The cathode of this portion is also connected over a conductor 81 to a source of positive threshhold battery. Under such conditions the negative pulse through the condenser 79 to the cathode must be greater in value than the positive battery supplied over the conductor 81 before the right-hand portion of the diode 76 will conduct.

The positive output of the left-hand portion of the diode 76 is fed by means of a conductor 82 to a one stage condenser-resistor filter indicated generally by the numeral 83. The negative output from the right-hand portion of the diode 76 appears on the anode circuit and is impressed over a conductor 84 to a junction point 86 with the conductor 82 leading to the filter 83. The filter 83 will operate to take an average of the positive and negative potentials applied thereto, the output of the filter being either negative or positive direct current depending upon which polarity of energy predominates. Also, such output may be neutralized if the values of positive and negative potential energy are equal.

The output of the filter 83 is fed over a conductor 87 to the normally negatively biased control grid of a reactance tube 88. The reactance tube 88 is a conventional type of quadrature circuit utilized for automatic frequency control and therefore it is not believed necessary to describe its operation in detail, such being well konwn in the art.

The bias voltage on the grid of the tube 88 is so adjusted by means of a potentiometer 89 that the zero-center corrector meter 90 is at rest at the zero or center position of the scale, said setting being in the absence of any correction energy being received from the corrector, or simply a no-signal condition. This position of the corrector meter indicates the approximate center of the frequency-control characteristic of reactance tube 88, so that upon being biased in a more negative direction, the tube's apparent capacitive reactance increases, and if biased less negative or in the positive direction, the effective capacitive reactance decreases. The reactance tube therefore operates as a variable capacitive load upon the crystal oscillator grid circuit in shunt with the frequency-adjusting trimmer condenser 15 for limited range frequency variation, with direct current bias control supplied by the corrector system described.

The normal adjustment procedure is to set the frequency of the oscillator by means of the trimmer condenser 15, with the reactance tube 88 biased in the center of its control characteristic, so that the frequency is identical with that at the transmitting station. Any minor deviations in frequency due to crystal aging or other causes will then be corrected for by resultant shift in the reactance tube 88 bias, the direction and amount of drift, fast or slow, being indicated directly by the meter reading, which then may be corrected for manually with the trimmer condenser 15, causing the meter 90 to be reset to zero.

With the line signals out of phase with the local receiving distributor, such as the condition which exists when the system is first placed in operation, assume that line signal reversals occur at a time so that only the left-hand portion of the "fast" gate tube 53 is operating. The "slow" gate tube 58 has zero output at this time, for reasons described previously. The output of the gate tube 53 is impressed on the output gate diode 76 to filter network 83, the resulting negative potential adding algebraically to the fixed bias potential to bias the reactance tube 88 to cut-off, and to increase to a maximum the frequency in the crystal oscillator, which is reflected in a proportionate increase in the distributor drive pulse frequency, and in the corrected squaring tube 43 frequency. The phase of the square-wave input to the right-hand portions of the gate tubes 53 and 58 with respect to the input to the left-hand portions of said tubes continues to shift until a position is reached where the "slow" gate tube 58 begins to conduct and deliver energy to inverter 72 and to the positive half of the output twin diode 76. Continued operation of the crystal oscillator at this higher frequency advances the phase until more and more energy is delivered to the positive output side of the output diode 76. At this time the filter 83 is integrating the positive and negative outputs of the diode 76 and modifying the grid bias to the reactance tube 88 until a point of equilibrium is reached, and the oscillator frequency has been restored to its original value and the system is in correct phase relationship as regards to the relative position of any given signal impulse and the receiving distributor. Any slight deviations of frequency in either the transmitting or the receiving oscillators will be readily detected by the corrector system and the compensation introduced by the reactance tube 88.

While the above description has described the circuit components and their operation in general it appears that a further description of the operation in detail is desirable at this point.

During the following description reference should be made to Fig. 5, wherein various wave characteristics at various points of the circuit have been illustrated. Further, from a comparison of the various wave characteristics with respect to each other the timing and operation of the various elements comprising the corrector may be viewed and understood more readily.

At the outset it might be mentioned that the negative distributor drive pulses on the conductor 36 are utilized to step the receiving multiplex distributor 40. That is, if a mechanical distributor is used the interval between two successive drive pulses will be equal to the interval that the distributor electrically bridges a single impulse segment. Likewise, if the electronic distributor of the above-mentioned T. A. Hansen application is utilized the interval between successive drive pulses will be equal to the interval that a single distributor tube is conducting.

It should also be noted that it is standard multiplex practice that the distributor make its selection at approximately the midpoint of the received signal impulse, assuming perfect synchronization. This practice is followed because due to signal distortion on the signaling channel the chances of obtaining the correct signal condition will theoretically be greatest at its midpoint.

Keeping the above in mind it may then be understood that with perfect synchronization the negative drive pulses on the conductor 36 should occur at the midpoint of the interval between successive positive pulses on the conductor 63, as these latter pulses signify signal transitions, or occur at the beginning and end of signal impulses of different conditions; i. e., marking and spacing.

The output from the one-shot multivibrator 66, as impressed on the grids of the left-hand portions of the tubes 53 and 58 lasts for an interval required for the multivibrator to return to its normal condition, once operated, which has been chosen as an interval equal approximately to one-quarter of a signal impulse time. In order to achieve this a condenser 65 of the correct capacity has been selected.

Still assuming that perfect synchronization exists, and so no correction is required, it may be understood that during the interval that the signal potential exists on the grids of the left-hand portions of the tubes 53 and 58 each tube will conduct for an equal period, in order that the positive and negative resulting potentials passing through the diode 76 may cancel each other in the filter 83. In order for this to occur the right-hand portions of the tubes 53 and 58 must likewise be allowed to conduct for equal intervals, as they supply blocking potential to their left-hand portion during that interval. Therefore, during the time that the right-hand portion of one of the tubes 53 and 58 is conducting its left-hand portion will be prevented from conducting even though its grid receives positive potential from the conductor 67. However, as the grids of the right-hand portions of the tubes 53 and 58 receive positive potential alternately from the conductors 48 and 54, and the grids of the left-hand portions of the same tubes receive positive potential simultaneously from the conductor 67, the left-hand portions of the tubes will both be allowed to conduct. As stated previously, if perfect synchronization occurs the conducting intervals for the left-hand portions of the tubes 53 and 58 should be approximately equal, depending on the relative output energy levels.

It will be seen that as the negative drive pulses on the conductor 36 occur at the midpoint of the signal impulses, and that as during any signal interval potential is applied on the conductors 48 and 54 alternately for a period on each approximately equal to one-half the interval, for proper operation it is necessary that the potential change from the conductors 48 and 54 occur at the midpoint of potential being impressed from the one-shot multivibrator 66 to the conductor 67. In order that this condition may exist, as the multivibrator operation is initiated by signal transitions, the selection networks 24 and 47 will be biased differently, to allow the potential impressed on the conductor 32 to be centered with respect to the periods of conductivity of the left-hand portion of the tube 43, during the negative portion of the controlling wave on the common conductor 22.

From the above description it may be seen that during the periods that the signals are received in perfect synchronization with respect to the drive pulses no correction will occur.

However, let it be now assumed that the line signals which are being received are out of synchronism and are fast with respect to the speed of operation of the receiving distributor. This indicates that the midpoints of the signal impulses are occurring prior to the negative drive pulses on the conductor 36. In order to correct for this condition it becomes necessary that the drive pulse frequency be increased, with the pulses coming sooner in time with respect to the signal impulses.

Under such an operating condition the signal transition point will occur earlier than normal, causing the one-shot multivibrator 66 to be operated earlier. The effect of this is to impress potential on the grids of the left-hand portions of the tubes 53 and 58 earlier than normal. Under this condition the left-hand portion of the tube 53 will conduct for a greater interval than the left-hand portion of the tube 58, resulting in a preponderance of negative potential being applied to the filter 83. This results in the filter, when it integrates the positive and negative input, passing negative potential to the conductor 87 and the control grid of the reactance tube 88. This, in effect, reduces the conductivity of the reactance tube 88, which through the conductor 91 decreases the capacitive loading on the quartz crystal, with a corresponding increase in frequency of oscillation.

The above operation will occur with varying amounts of negative potential being applied to the conductor 87, until such time as the apparatus is once again in perfect synchronism.

If it now be assumed that the received line signals are slow with respect to the speed of operation of the receiving distributor it indicates that the frequency drive pulses on the conductor 36 are occurring before the midpoint of the signal interval. In order to overcome this condition the frequency of the drive pulses must be slowed down.

Under the above condition the apparatus will operate conversely to that described above for fast signals. The multivibrator 66 will be operated later than usual, which results in the left-hand portion of the tube 58 conducting for a longer interval than the left-hand portion of the tube 53. This results in a preponderance of positive potential being impressed through the diode 76, the filter 83 then passing positive potential to the conductor 87. Such positive potential on the control grid of the reactance tube 88 causes its conductivity to be increased, resulting through the conductor 91 in increased loading on the quartz crystal. This condition causes the frequency of vibration of the piezo-crystal in the unit 11 to be reduced, resulting in a reduced frequency output from the divider 13.

The above correction will occur as long as the signal impulses are slow with respect to the operation of the distributor, varying amounts of positive potential being applied to the conductor 87 depending on the relative slowness of the signal impulses.

From the above descriptions it may be seen that correction will occur automatically under any condition when synchronism does not exist, such correction continuing until synchronization is achieved.

While a particular embodiment of the invention has been illustrated and described, it is obvious that modifications and additions may be made thereto without departing from the spirit and scope of the invention.

What is claimed is:

1. In synchronization apparatus, means to receive a series of impulses with which a local device is to be held in synchronism, means to drive said local device, means to compare the received impulses and said driving means, means to produce from said comparison means an average electrical charge varying in polarity in accordance with the condition of phase between said driving means and the received signals, and reactance means controlled by the average charge from said charge production means for controlling said driving means to restore correct phase condition, and to maintain synchronism.

2. In apparatus for synchronizing a local device with received signal impulses, pulse generating means for operating said local device, a crystal controlled oscillator for controlling said pulse generating means, signal impulse receiving means, means for comparing the phase of the pulses generated and the signal impulses received, means controlled by said comparison means for generating an average charge whose polarity depends on the relative phase of the local device and the received signal impulses, and reactance tube means controlled by said charge generating means in circuit with said crystal controlled oscillator for restoring phase.

3. In a synchronization system, in combination with a telegraph distributor which is to be synchronized with received signal impulses, impulse generating means for operating said distributor, crystal controlled means for controlling said impulse generating means, signal impulse receiving means, means to compare the phase of the received signal impulses and the generated impulses, means controlled by said comparison means for generating an average charge whose polarity depends on the relative phase of the generated impulses and the received signal impulses, and reactance means controlled by said charge generating means connected in circuit with said crystal controlled means for restoring correct phase and for maintaining synchronism.

4. In a synchronization system in combination with a telegraph distributor which is to be synchronized with received signal impulses, impulse generating means for operating said distributor, a crystal controlled oscillator for controlling said impulse generating means, signal impulse receiving means, means to compare the relative phase of the impulses generated and the received signal impulses, means controlled by said comparison means for producing an impulse of a polarity depending on the relative phase of the impulses generated and the received signal impulses, and a reactance tube circuit controlled by said polarity impulse producing means and connected in circuit with said crystal controlled oscillator to maintain synchronism.

5. In a system for synchronizing a local device with received signal impulses, means for operating said device, signal impulse receiving means, means to compare said operating means and the received signal impulses and to produce a charge of one polarity, a second means to compare said operating means and the received signal impulses and to produce a charge of a polarity opposite to the above-mentioned produced charge, a condenser for combining both of said produced charges, a preponderance of one of said charges indicating the out-of-phase condition, and reactance means controlled by the combined charge for controlling said operating means to restore synchronism.

6. In a synchronization system, in combination with a telegraph distributor which is to be synchronized with received signal impulses, impulse generating means for operating said distributor, signal impulse receiving means, means for comparing the generated impulses and the received signal impulses and producing a charge of a polarity indicative of the out-of-phase condition of the generated impulses with respect to the received signal impulses, and reactance means controlled by the produced charge for controlling said impulse generating means in a manner to maintain synchronism.

7. In apparatus for synchronizing a telegraph distributor with received signal impulses, signal impulse receiving means, means including a frequency divider for generating impulses for operating said distributor, a crystal controlled oscillator for controlling said means including said frequency divider, tube means for comparing the generated impulses and the received signal impulses, and reactance means controlled by said tube means for controlling said crystal controlled oscillator, whereby the frequency of the impulses generated by said means including said frequency divider will be altered in a manner tending to maintain synchronism.

8. In apparatus for synchronizing a telegraph distributor with received signals, means to generate an impulse for every signal transition, means for operating said distributor, means for comparing the distributor operating means and the generated impulses, a condenser under the control of said comparison means which is charged thereby with one or the other of two polarities in accordance with the relative out-of-phase condition of said operating means and the generated impulses, and reactance means controlled by said condenser for controlling said distributor operating means in a manner tending to maintain synchronism.

9. In apparatus for synchronizing a local device with received signal impulses, pulse generating means for operating said local device, a crystal controlled oscillator for controlling said pulse generating means, signal impulse receiving means, means for comparing the phase of the pulses generated and the signal impulses received, means controlled by said comparison means for generating an average charge whose polarity depends on the relative phase of the local device and the received signal impulses, and means controlled by said charge generating means in circuit with said crystal controlled oscillator for restoring phase.

10. In a synchronization system, in combination with a telegraph distributor which is to be synchronized with received signal impulses, impulse generating means for operating said distributor, crystal controlled means for controlling said operating means, signal impulse receiving means, means to compare the phase of the received signal impulses and the generated impulses, reactance means controlled by said comparison means connected in circuit with said crystal controlled means for restoring correct phase and for maintaining synchronism, and a meter controlled by said reactance means, whereby any deviation in speed of the telegraph distributor will be indicated visually.

THEODORE ALAN HANSEN.

REFERENCES CITED

The following references are of record in the file of this patent:

UNITED STATES PATENTS

| Number | Name | Date |
|---|---|---|
| 1,881,684 | Knoop | Oct. 11, 1932 |
| 2,031,976 | Noxon | Feb. 25, 1936 |
| 2,176,742 | La Pierre | Oct. 17, 1939 |
| 2,252,364 | Clark | Aug. 12, 1941 |
| 2,357,671 | Latimer | Sept. 5, 1944 |
| 2,423,616 | Rath | July 8, 1947 |
| 2,540,167 | Houghton | Feb. 6, 1951 |